(12) United States Patent
Weinbrenner

(10) Patent No.: US 8,800,635 B2
(45) Date of Patent: Aug. 12, 2014

(54) LATERAL GUIDE FOR SHADING ROLLER BLIND, AND SHADING ROLLER BLIND FOR MOTOR VEHICLES

(75) Inventor: Harry Weinbrenner, Oberboihingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 961 days.

(21) Appl. No.: 12/217,970

(22) Filed: Jul. 10, 2008

(65) Prior Publication Data

US 2009/0014135 A1   Jan. 15, 2009

(30) Foreign Application Priority Data

Jul. 11, 2007   (DE) .......................... 10 2007 034 693

(51) Int. Cl.
| | |
|---|---|
| B60J 1/20 | (2006.01) |
| B60J 3/00 | (2006.01) |
| B60J 11/00 | (2006.01) |
| A47H 3/00 | (2006.01) |
| E06B 9/17 | (2006.01) |
| E06B 9/58 | (2006.01) |

(52) U.S. Cl.
CPC ................. *E06B 9/58* (2013.01); *B60J 1/2027* (2013.01); *B60J 1/2086* (2013.01)
USPC ....................... 160/370.22; 160/274; 296/97.8

(58) Field of Classification Search
USPC .................. 160/266, 267.1, 268.1, 270, 272, 160/370.22; 403/292; 238/151, 175, 230, 238/154, 176
See application file for complete search history.

(56) References Cited

U.S. PATENT DOCUMENTS

| | | | | |
|---|---|---|---|---|
| 2,993,647 | A | * | 7/1961 | Deller .......................... 238/122 |
| 3,528,608 | A | * | 9/1970 | Janzow et al. ................ 238/151 |
| 3,815,818 | A | * | 6/1974 | Janzow et al. ................ 238/228 |
| 2002/0033616 | A1 | | 3/2002 | Schlecht et al. |
| 2002/0074824 | A1 | | 6/2002 | Schlecht et al. |
| 2004/0069425 | A1 | | 4/2004 | Hansen et al. |
| 2005/0045287 | A1 | * | 3/2005 | Hansen et al. ........... 160/370.22 |
| 2005/0121152 | A1 | | 6/2005 | Weinbrenner |
| 2006/0290162 | A1 | | 12/2006 | Schlecht |
| 2007/0023152 | A1 | | 2/2007 | Starzmann et al. |
| 2007/0137803 | A1 | * | 6/2007 | Hansen et al. ........... 160/370.22 |
| 2007/0297745 | A1 | * | 12/2007 | Moriarty et al. .............. 385/135 |

FOREIGN PATENT DOCUMENTS

| | | |
|---|---|---|
| DE | 1 002 240 | 2/1957 |
| DE | 10339583 A1 | 3/2005 |
| DE | 20 2004 020 106 U1 | 4/2006 |
| EP | 1182066 A2 | 2/2002 |
| EP | 1215063 A1 | 6/2002 |

(Continued)

OTHER PUBLICATIONS

German Patent Office Office Action dated May 20, 2008 (4 pages).

(Continued)

*Primary Examiner* — Katherine Mitchell
*Assistant Examiner* — Jeremy Ramsey
(74) *Attorney, Agent, or Firm* — Flynn, Thiel, Boutell & Tanis, P.C.

(57) ABSTRACT

A lateral guide for a shading roller blind incorporating at least one guide rail with a first plug-in element and a connection piece with a second plug-in element which is complementary to the first plug-in element and is couplable thereto. The intercoupled plug-in elements are displaceable relative to each other to compensate for tolerance.

16 Claims, 3 Drawing Sheets

(56) References Cited

FOREIGN PATENT DOCUMENTS

| | | | |
|---|---|---|---|
| EP | 1375220 | A1 | 1/2004 |
| EP | 1 533 157 | A2 | 5/2005 |
| EP | 1582386 | A2 | 10/2005 |
| EP | 1736335 | A2 | 12/2006 |
| EP | 1747923 | A2 | 1/2007 |

OTHER PUBLICATIONS

European Patent Office Search Report dated Nov. 22, 2010 (5 pages).

* cited by examiner

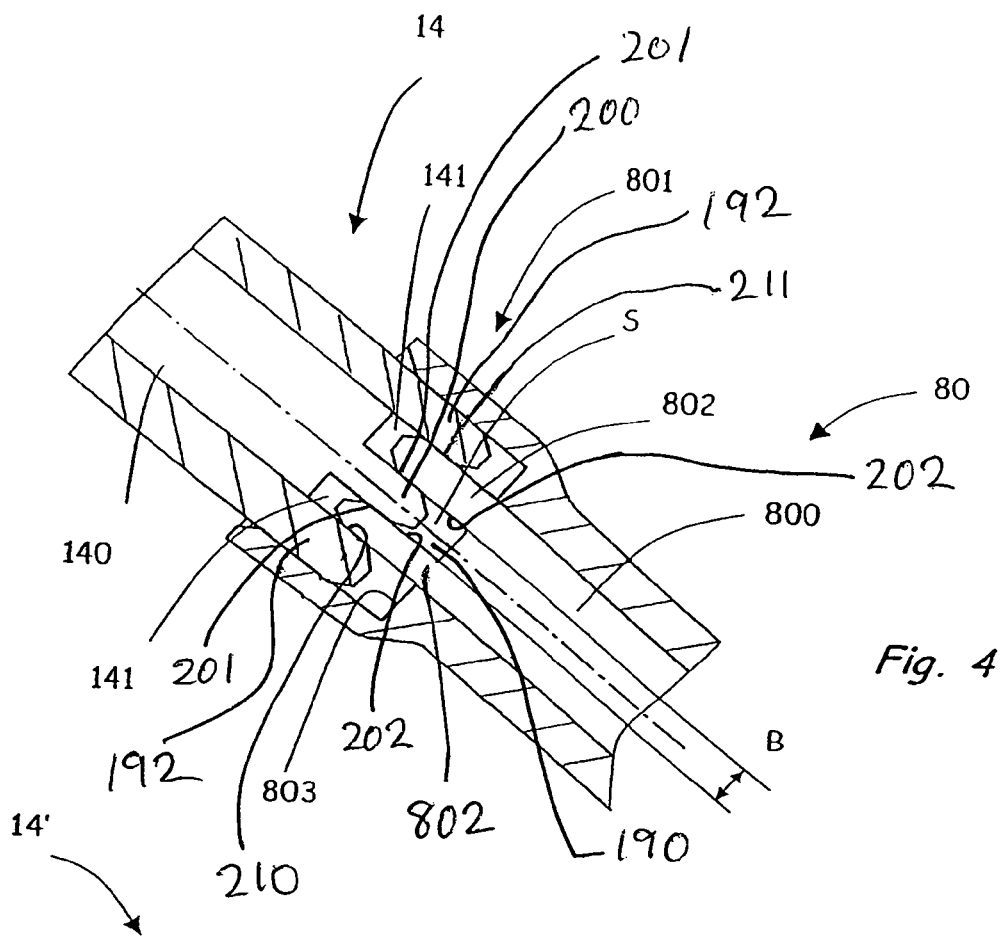
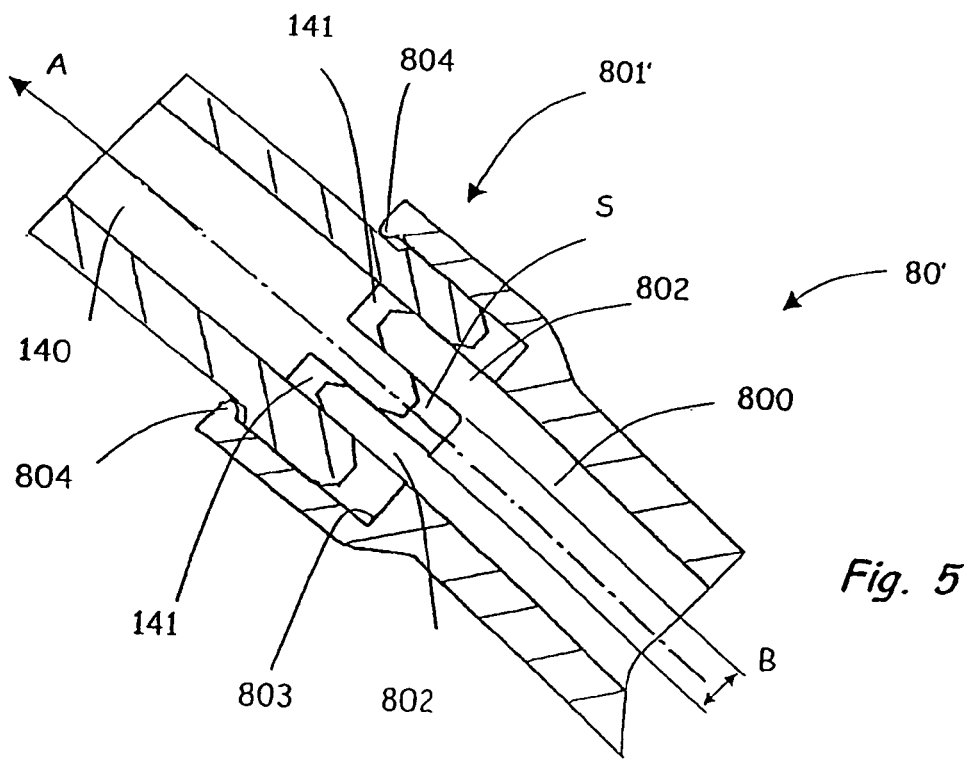
Fig. 4
Fig. 5

LATERAL GUIDE FOR SHADING ROLLER BLIND, AND SHADING ROLLER BLIND FOR MOTOR VEHICLES

FIELD OF THE INVENTION

The invention relates to a lateral guide for a shading roller blind and to an associated shading roller blind for motor vehicles.

BACKGROUND OF THE INVENTION

EP 1 533 157 A2 discloses a rear-window roller blind comprising a winding shaft, a roller blind strip which can be wound thereon and a pull-out profile attached to the free end of the roller blind strip. The pull-out profile is guided at at least one end in a guide rail. The rear-window roller blind further comprises a base arrangement which serves as a bearing arrangement for the winding shaft. For assembly, the guide rails can be inserted on an assembly line into side trim parts of the C-pillars of the motor vehicle and assembled thereon. The guide rail is provided with a first plug-in means. The base arrangement has a coupling arrangement comprising a second plug-in means which is complementary to the first plug-in means and is couplable thereto. The rear-window roller blind can be assembled with the base arrangement, for example, below a parcel shelf. Subsequently, in a separate step, the side trim parts, with the guide rails inserted therein, can be assembled on the C-pillars. In a further step, the plug-in means are engaged with each other with a precise fit. The second plug-in means is mounted via a resilient shank in order thus to position the two plug-in means relative to each other.

The object of the invention is to provide a lateral guide for a shading roller blind that can be assembled in a simple manner while making allowance for production tolerances. It is a further object of the invention to provide an associated shading roller blind.

The object of the invention is achieved by a lateral guide for a shading roller blind comprising at least one guide rail with a first plug-in means and a connection piece with a second plug-in means which is complementary to the first plug-means and is couplable thereto, the intercoupled plug-in means being displaceable relative to each other to compensate for tolerance. The connection between the guide rail and the connection piece—more precisely between the two plug-in means—is thus not rigid at least in a plug-in direction or axial direction of the rail. In other words, the plug-in connection has a degree of freedom at least in the plug-in direction. The plug-in direction is also referred to as the axial direction of the guide rail, wherein the guide rail can run in an arcuate manner. A plug-in position which can be individually selected in the plug-in direction thus allows, for example, compensation for tolerance between a guide rail fixed in the motor vehicle and a connection piece associated with the shading roller blind. The plug-in means can in this case be formed at the opposing ends of the guide rail and the connection piece.

In a development of the invention, the plug-in means have in the plug-in direction at least one groove and a tongue complementary thereto. The tongue-and-groove connection can prevent twisting. The groove is in this case in one embodiment formed on the guide rail, the complementary tongue being formed on the connection piece. Alternatively or additionally, a tongue, which can be inserted into a groove on the connection piece, is formed on the guide rail.

In one configuration of the invention, the plug-in means have teeth which are complementary in the plug-in direction. Such teeth prevent breaks which remain during coupling or a gap remaining between the connection piece and the guide rail from acting as what are known as bumps or uneven portions for a sliding element or the like which is displaceable in the guide rail. The width of the individual grooves and/or tongues forming the teeth is in this case preferably less than the width of a sliding element guided in the guide rail.

In one configuration of the invention, at least one plug-in means has at least one locking element by means of which the guide rail and the connection piece can be engaged with each other in the plug-in direction with play. In other words, the plug-in means are joined together in a floating manner in the plug-in direction. The locking means forms a stop, as it delimits a maximum distance of the plug-in means from each other and accordingly prevents undesirable decoupling during use.

In a development of the invention, the guide rail and the connection piece have coaxially couplable guide grooves for a sliding element. The sliding element is, for example, connected to a pull-out profile of a roller blind strip of the shading roller blind. Means for displacing the sliding element in the guide grooves can act on the sliding element in one configuration. The guide rail and/or the guide groove preferably run in a curved manner, in particular in a (circular) arcuate manner, although inconstancy in the course of the guide groove is avoided for good displaceability of the sliding element. Preferably, the curvature of the guide rail and/or the guide groove follows a contour of an associated window.

The object is also achieved by a shading roller blind for a motor vehicle with a pull-out profile, which is guided in a lateral guide according to the invention. The shading roller blind is, for example, configured as a sun protection roller blind on a panorama window in the roof of the vehicle, as a sun and/or visibility protection roller blind on a side door or as a rear window roller blind. The pull-out profile has in one configuration at at least one end a sliding element or the like which is displaceably mounted in the guide groove. The sliding element is in one configuration configured in one piece with the pull-out profile. In other configurations, the sliding element is produced separately, for example as a sliding block, wherein a connection between the pull-out profile and sliding block can be pivotable in its configuration. Materials having good sliding properties can be used for the sliding block and/or the guide groove. The pull-out profile is arranged at a free end of a roller blind strip, so that the roller blind strip can be unwound from a winding shaft by applying a force on the pull-out profile in a pull-off direction. The pull-out profile is in one configuration rigidly connected to the roller blind strip and/or configured at least partly in one piece therewith. In other configurations, the pull-out profile is attached to the roller blind strip so as to be able to move along an edge thereof.

In one configuration of the shading roller blind, the guide rail is connected to a bodywork and/or a trim part of a motor vehicle, in particular in the region of a C-pillar, and/or configured in one piece therewith at least in certain portions. The shading roller blind is for example configured as a rear window roller blind, the guide rails being arranged on the C-pillar of the motor vehicle. The guide rails are connectable to the motor vehicle bodywork and/or a corresponding side trim part as early as a preassembly stage, wherein suitable locking means can be provided for this purpose on each guide rail, such as are described for example in EP 1 533 157 A2. The plug-in connection according to the invention with compensation for tolerance allows simple connection of the guide rail, which is attached to the side trim part, to the connection piece during the final assembly.

In one configuration of the shading roller blind, the connection piece is formed on a base arrangement and/or connectable to a base arrangement. The base arrangement is used for preassembly and/or a test operation of the shading roller blind. The shading roller blind can be assembled with the base arrangement in the motor vehicle, for example in the region of a side window or below a parcel shelf. A corresponding base arrangement is for example described in the aforementioned EP 1 533 157 A2, to the full content of which reference is made. The base arrangement comprises in one configuration a resilient peg or shank by means of which the connection piece is mounted. Such resilient mounting provides further degrees of freedom for the plug-in connection of the connection piece to the guide rail. The base arrangement preferably serves also has a mount for a winding shaft of the shading roller blind.

In one configuration of the shading roller blind, a drive arrangement is provided for unwinding a roller blind strip from a winding shaft and/or for winding the roller blind strip onto a winding shaft. The drive arrangement allows fully automatic and/or semiautomatic actuation of the shading roller blind. A semiautomatic actuation arrangement is configured for example as a spring accumulator assembly, wherein the winding shaft and/or the roller blind strip can be arrested in a stowage position and once the arresting has been released, the roller blind strip is unwound owing to a spring force. Retraction and winding of the roller blind strip are on the other hand carried out manually counter to the spring force of the spring accumulator assembly, the roller blind strip being wound onto the winding shaft in a compact manner by a restoring spring. In another configuration, unwinding can be carried out by manual actuation, wherein the roller blind strip can for example become caught in one position or a plurality of desired, extended positions and the restoring spring or a spring motor automatically carries out winding once the catching engagement has been released. In another configuration, motor drives are provided, the motor drive assisting the user in the actuation and/or the motor drive replacing manual actuation. The motor drive interacts for example with what is known as an antenna which acts on the pull-out profile for unwinding the roller blind strip. The motor drive can for example be configured as a pneumatic drive, hydraulic drive and/or with an electric motor.

In one configuration of the invention, the drive arrangement comprises at least one flexible push element which can be guided in the guide rail and/or the connection piece without the risk of buckling. The push element acts on a sliding element or the like which is guided in the guide groove and operatively connected to the shading roller blind, in particular to a pull-out profile. The push element is for example configured as what is known as a flexible shaft, toothed rack or toothed cord having a substantially cylindrical core and a coil surrounding the core. A toothed rack of this type can be driven in a simple manner by a gear-wheel which can in turn be driven by an electric motor or the like.

Further advantages of the invention will emerge from the subsequent description of exemplary embodiments of the invention which are illustrated schematically in the drawings. The drawings use uniform reference numerals for identical or similar components. All of the features and/or advantages emerging from the claims, the description or the drawings, including method steps, design details and spatial arrangements, may be instrumental to the invention both individually and in a broad range of combinations. Features described or illustrated as part of an exemplary embodiment can also be used in another exemplary embodiment to obtain a further embodiment of the invention.

BRIEF DESCRIPTION OF THE DRAWINGS

In the drawings:

FIG. 4 shows a detail IV according to FIG. 2; and

FIG. 5 shows an alternative embodiment of the detail according to FIG. 4.

DETAILED DESCRIPTION

Figure 1:
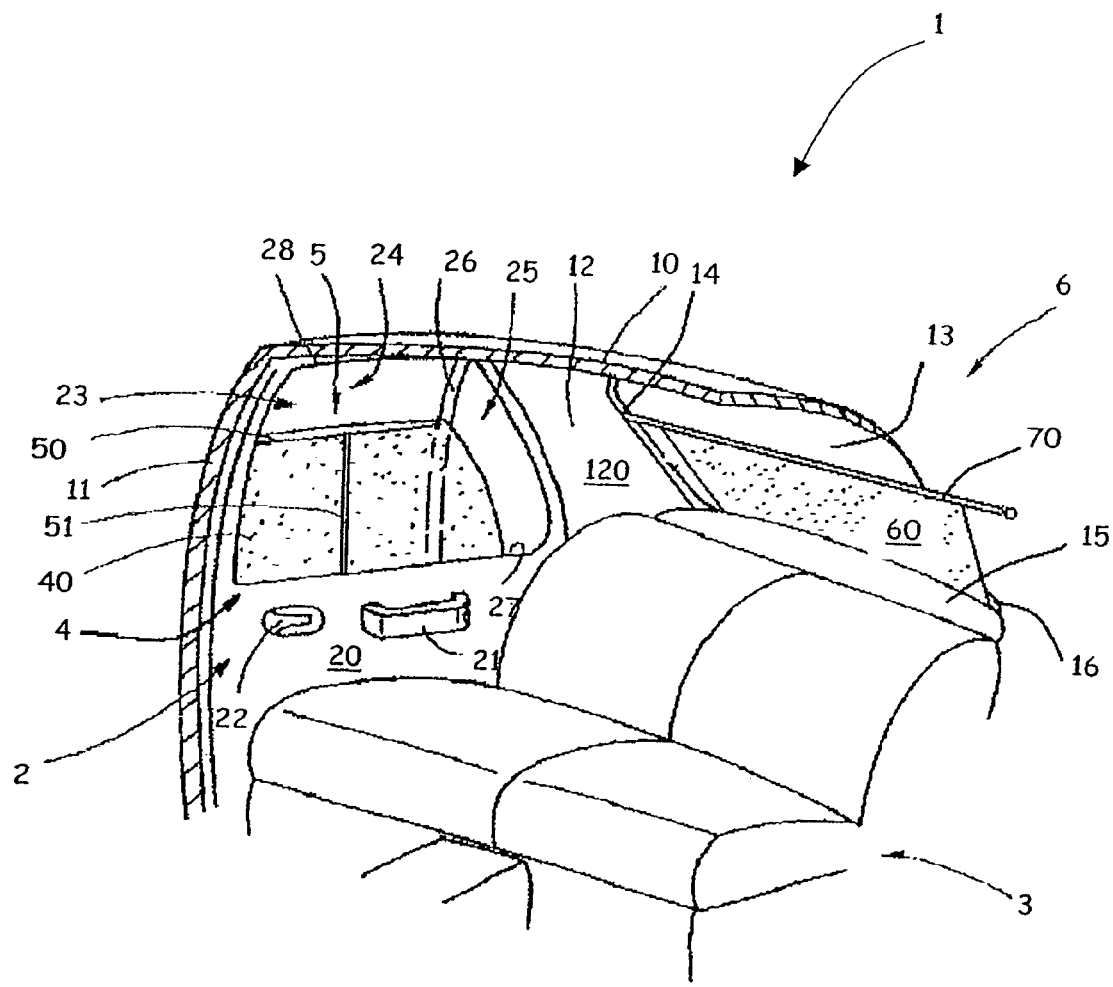
FIG. 1 is a partly cut-away, perspective view of a rear region of a motor vehicle, looking onto the inside of the rear right door.

FIG. 1 is a partly cut-away, perspective view of a rear region of a motor vehicle 1, looking onto the inside of a rear right side door 2. The motor vehicle 1 has a vehicle roof 10 from which a B-pillar 11 of the motor vehicle 1 leads laterally to an undercarriage (not shown). As is known, a corresponding B-pillar is also provided on the left-hand side (not shown in FIG. 1) of the motor vehicle 1. The illustrated motor vehicle 1 also has a C-pillar 12 with a side trim 120. The roof 10 merges at a rear edge with a frame of a rear window opening 13 into which a rear window (not shown) can be inserted. Between the B-pillar 11 and the C-pillar 12, the right rear side door 2 is attached in a known manner, in particular by means of hinges (not shown). A rear seat 3 is located at the level of the side door 2.

The inside, which can be seen in FIG. 1 and faces an interior of the motor vehicle 1, of the side door 2 has an inner trim 20. A door handle 21 and an actuating latch 22 for a door lock (not shown) are provided on the inner trim 20. Further elements (not shown), such as loudspeakers and the like, can also be integrated into the side door 2 and/or attached thereto.

The side door 2 has a window opening 23 which is divided into a first portion 24 and a second portion 25 by a web 26. The second portion 25 is in this case configured as an opening for what is known as a triangular window, so that the window opening 23 is substantially trapezoidal. The window opening 23 has a lower edge 27 and an upper edge 28, wherein the upper edge 28 conventionally does not run parallel to the lower edge 27 but rather can run in a curved manner. A two-part side window (not shown) can be inserted into the window opening 23. The side window is conventionally displaceable at least in the first portion 24.

The window opening 23 can be covered by a shading roller blind configured as a side window roller blind 4 with a roller blind strip 40. For unwinding the roller blind strip 40 from a winding shaft (not shown), the illustrated side window roller blind 4 has linear guide means 5 with a pull-out profile 50 and an antenna or rod 51. The pull-out profile 50 is attached to a free edge of the roller blind strip 40. The pull-out profile 50 is guided in a lateral guide rail (which cannot be seen) arranged in the B-pillar 11. In the illustrated exemplary embodiment, the pull-out profile 50 can be moved by means of the rod 51. Alternatively and/or additionally, it is also conceivable for the linear guide means 5 to comprise push members or the like which are guided in the guide rail (which cannot be seen). In still other configurations, the roller blind strip 40 is unwound manually.

Also provided in the illustrated exemplary embodiment is a shading roller blind which is configured as a rear window roller blind 6 and has a roller blind strip 60 for covering the rear window opening 13. Arranged at the free end of the roller blind strip 60 is a pull-out profile 70 which is guided in two lateral guide rails 14, only one of which can be seen in FIG. 1. The guide rails 14 are arranged in the region of the C pillars 12 and connected to the vehicle bodywork and/or the side trim. The roller blind strip 60 can be wound onto a winding shaft (not shown in FIG. 1) which is arranged below a parcel shelf 15, the roller blind strip 60 being guided by a slot 16.

Figure 2:
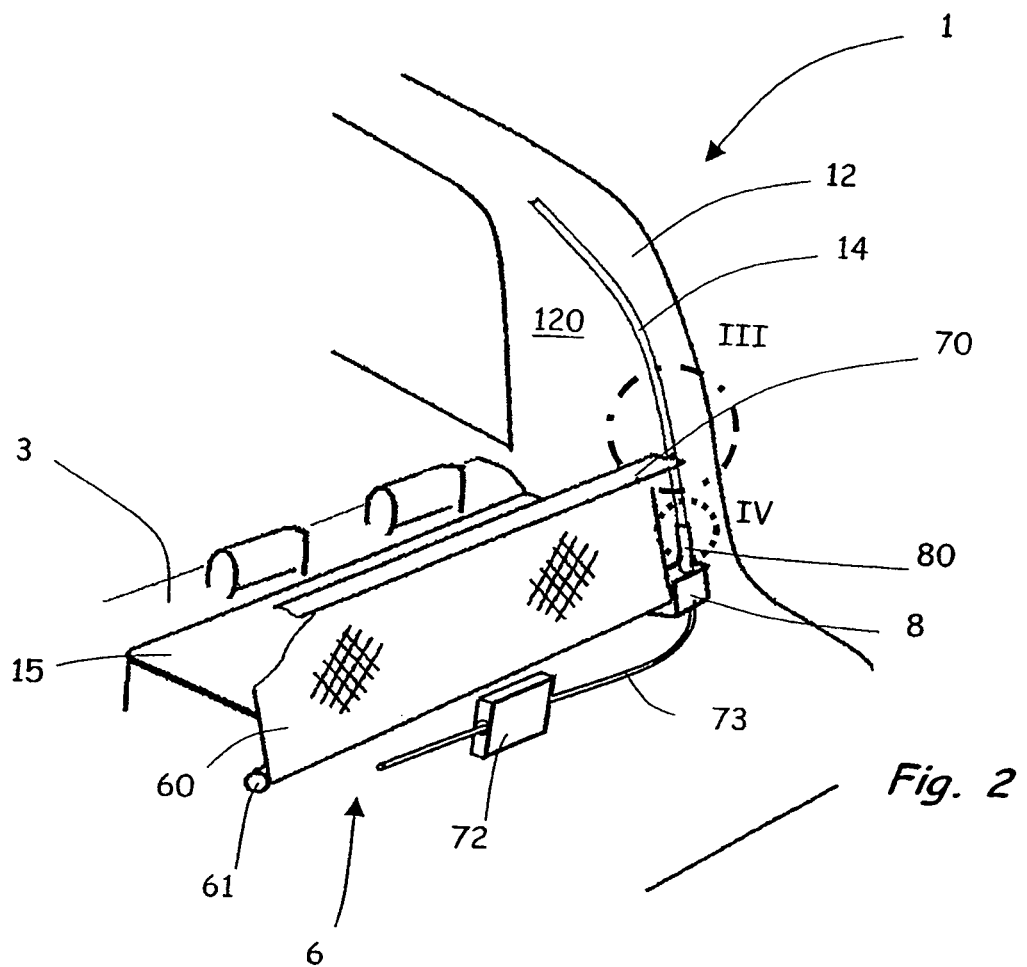
FIG. 2 is a partly cut-away, perspective view of the rear region of the motor vehicle according to FIG. 1, looking from behind onto an inner region.

FIG. 2 shows schematically the rear region of the motor vehicle 1 according to FIG. 1, looking from behind onto the inner region, wherein the rear window roller blind 6 can in particular be seen. Details III and IV are shown enlarged in FIGS. 3 and 4. The illustrated rear window roller blind 6 comprises a winding shaft 61 onto which the roller blind strip 60 can be wound. The winding shaft 61 is mounted in a schematically illustrated base arrangement 8. The pull-out profile 70 is arranged at the free end of the roller blind strip 60.

Figure 3:
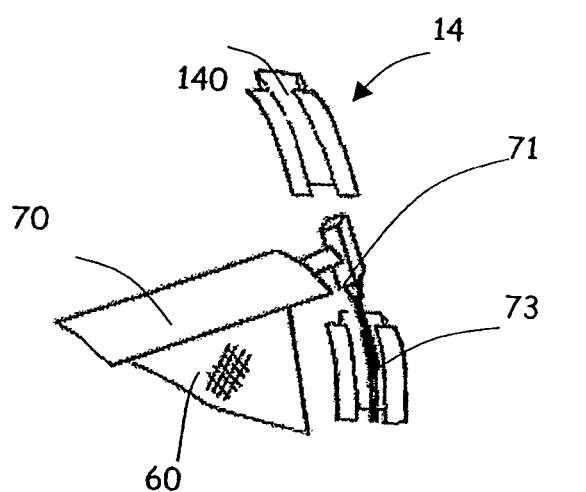
FIG. 3 shows a detail III according to FIG. 2.

The pull-out profile 70 has at both ends sliding elements 71, wherein one of the sliding elements 71 can be seen in detail in FIG. 3. The sliding element 71 is pivotably connected to the pull-out profile 70. The guide rail 14 has a guide groove 140 in which the sliding element 71 is displaceably guided. The guide groove 140 can have any desired shape for this purpose.

In the illustrated exemplary embodiment, a motor drive 72 is provided for automatically winding and/or unwinding by remote control the roller blind strip 60 onto/from the winding shaft 61. The motor drive 72 interacts in the illustrated exemplary embodiment with a symmetrically illustrated push member 73 which acts, as shown in FIG. 3, on the sliding element 71 to unwind the roller blind strip 60. The push member 73 is configured for example as what is known as a toothed cord which can be driven by a gear-wheel (not shown) provided on the drive 72. The push member 73 is also displaceable in the guide groove 140, the push member 73 preferably being guided in the guide groove 140 without the risk of buckling. Alternatively, the push member itself can be configured so as to be buckle-proof, thus eliminating the need for guidance without the risk of buckling.

The guide rail 14 is in the illustrated exemplary embodiment integrated in the side trim 120 of the C-pillar 12 and can be assembled therewith in the motor vehicle 1. The rear window roller blind 6 can be assembled below the parcel shelf 15. A connection piece 80 is provided on the base arrangement 8, the guide rail 14 and the connection piece 80 being couplable to each other by mutually complementary plug-in means.

FIG. 4 is a detailed cut-away view of the connection of the plug-in means of the guide rail 14 to the connection piece 80 of the plug-in means. As may be seen in FIG. 4, the connection piece 80 has a guide groove 800 which is configured coaxially with the guide groove 140 of the guide rail 14. In the illustrated exemplary embodiment, the connection piece 80 is widened at one end 801, so that the guide rail 14 can be inserted into the end 801. Tongues or teeth 802, which engage with complementary grooves 141 in the guide rail 14, are also formed at the end 801 of the connection piece 80 and a further groove 190 is formed in connection piece 80 between teeth 802. As shown in FIG. 4, guide rail 14 has a tooth 200 which projects between the grooves 141. Tooth 200 has respective oppositely-facing and axially-extending surfaces 201 which engage respective inner surfaces 202 of teeth 802. Further, grooves 141 of guide rail 14 are disposed adjacent, but spaced from, respective outer portions 192 of guide rail 14, and inner surfaces 210 of these portions 192 are engaged with outer surfaces 211 of teeth 802. Plug-in teeth formed in this way prevent twisting. Furthermore, as a result, a width B of a gap S remaining during coupling between the guide rail 14 and the connection piece 80 is reduced in size so as to prevent bumps for a sliding element 71 according to FIG. 3. A maximum depth of insertion of the guide rail 14 into the connection piece 80 is delimited by a stop 803 on the connection piece 80 and also by the depth of the grooves 141.

FIG. 5 shows a guide rail 14' and a connection piece 80' according to a second exemplary embodiment of the invention. The components correspond in this case substantially to the components according to FIG. 4. Uniform reference numerals are used for identical components and these components will not be described in detail. Locking lugs 804, which delimit a movement of the guide rail 14' relative to the connection piece 80' in the axial direction A counter to the direction of insertion, are formed at one end 801' of the connection piece 80' for receiving the guide rail 14'. As a result of the locking lugs 804, the connection piece 80' and the guide rail 14' are engaged with each other with play in the axial direction A. This prevents undesirable detachment of the plug-in connection between the connection piece 80' and the guide rail 14'.

The connection pieces 80, 80' can be mounted, as for example is known from EP 1 533 157 A2, on a resilient peg, so that the degrees of freedom achieved in the base arrangement 8 according to EP 1 533 157 A2 are adhered to. In addition, the invention provides compensation for tolerance in the axial direction A.

The invention claimed is:

1. A lateral guide for a shading roller blind, said guide comprising a guide rail and a connection piece, said guide rail comprising a guide groove which receives a sliding element therein guiding a free end of a pull-out profile of a roller blind, said guide rail and said connection piece including respective plug-in elements configured for coupling to one another and when coupled being displaceable relative to one another to compensate for tolerances, said plug-in element of said guide rail being coupled to said plug-in element of said connection piece in a plug-in direction defined along a longitudinal axis of said guide rail, a first of said plug-in elements defining a pair of teeth spaced apart from one another in a direction transverse to the axis and defining a groove therebetween, a second of said plug-in elements defining a pair of grooves and a tooth therebetween, said grooves of said second plug-in element being spaced from one another in a direction transverse to the axis, said teeth and said grooves of said first and second plug-in elements all being oriented in the plug-in direction, said teeth of said first plug-in element being engaged within the respective said grooves of said second plug-in element, and said tooth of said second plug-in element being engaged within said groove of said first plug-in element.

2. The lateral guide of claim 1, wherein said groove of said first plug-in element is closed in a direction transverse to the axis by said teeth of said first plug-in element, and said grooves of said second plug-in element are closed in a direction transverse to the axis by portions of said second plug-in element to prevent twisting of said guide rail and said connection piece relative to one another about the axis.

3. The lateral guide of claim 1, wherein said teeth of said first plug-in element have respective outer surfaces extending in a direction along the axis which are disposed in axially-overlapping and facing relation with respective portions of said second plug-in element, said tooth of said second plug-in element having respective outer surfaces extending in a direction along the axis which are disposed in axially-overlapping and facing relation with respective inner surfaces of said teeth of said first plug-in element which face one another and define respective opposite sides of said groove of said first plug-in element, wherein said outer surfaces of said first plug-in element are engaged with the respective said portions of said second plug-in element and said outer surfaces of said tooth of said second plug-in element engage with the respective inner surfaces of said teeth of said first plug-in element to prevent twisting of said guide rail and said connection piece relative to one another about the axis.

4. The lateral guide of claim 1, further including a locking arrangement cooperating between said first and second plug-in elements, said locking arrangement permitting engagement of said first and second plug-in elements with one another with play in the direction of the axis.

5. The lateral guide of claim 4, wherein said locking arrangement comprises locking lugs defined on one of said first and second plug-in elements which project in a direction transverse to the axis and engage the other of said first and second plug-in element to limit movement of said guide rail in a direction opposite to the plug-in direction.

6. The lateral guide of claim 1, wherein the guide groove of said guide rail is a first guide groove and said connection piece each defines a second guide groove therein configured for receiving therein a sliding element of a shading roller blind, said first and second guide grooves being coaxially oriented and coextensive relative to one another when said guide rail is engaged with said connection piece.

7. A shading roller blind having a pull-out profile including an end which is guided in a lateral guide according to claim 1.

8. The shading roller blind of claim 7, wherein said guide rail is configured for connection to a side trim part of a motor vehicle in a region of a C-pillar.

9. The shading roller blind of claim 7, wherein said guide rail is configured in one piece with a side trim part of a motor vehicle in a region of a C-pillar.

10. The shading roller blind of claim 7, further including a base arrangement, said base arrangement comprising said connection piece.

11. The shading roller blind of claim 10, wherein the guide groove of said guide rail is a first guide groove and said connection piece defines a second guide groove therein configured for receiving therein a sliding element of said shading roller blind, said first and second guide grooves being coaxially oriented and coextensive relative to one another when said guide rail is engaged with said connection piece, said shading roller blind including a blind strip having an end connected to said pull-out profile, a winding shaft mounted on said base arrangement, and a drive arrangement for unwinding said blind strip from said winding shaft and for winding said blind strip onto said winding shaft, said drive arrangement comprising a flexible push element guided in said guide rail and acting on said sliding element to actuate said blind strip.

12. A lateral guide for a shading roller blind, said guide comprising a guide rail and a connection piece, said guide rail and said connection piece including respective plug-in elements configured for coupling to one another and when coupled being displaceable relative to one another to compensate for tolerances, said plug-in element of said guide rail being coupled to said plug-in element of said connection piece in a plug-in direction defined along a longitudinal axis of said guide rail, a first of said plug-in elements defining a pair of grooves therein and a second of said plug-in elements defining a pair of teeth engaged within the respective said grooves, said teeth and said grooves all being oriented in the plug-in direction, said teeth of said second plug-in element having respective axially-extending surfaces which engage corresponding axially-extending surfaces of said first plug-in element defining said grooves to prevent twisting of said guide rail and said connection piece relative to one another about the axis, said guide rail being connected to and guiding a free end of a pull-out profile of a shading roller blind.

13. The lateral guide of claim 12, wherein said grooves of said first plug-in element are spaced from one another in a direction transverse to the axis and said teeth of said second-plug in element are spaced from one another in a direction transverse to the axis.

14. The lateral guide of claim 13, further including a locking arrangement cooperating between said first and second plug-in elements which permits engagement of said first and second plug-in elements with one another with play in the direction of the axis.

15. The lateral guide of claim 14, wherein said locking arrangement comprises locking lugs defined on one of said first and second plug-in elements which project in a direction transverse to the axis and engage the other of said first and second plug-in elements to limit movement of said guide rail in a direction opposite to the plug-in direction.

16. The lateral guide of claim 13, wherein said guide rail and said connection piece each define a guide groove therein, said guide grooves being coaxially oriented and coextensive relative to one another when said guide rail is engaged with said connection piece, and said guide grooves being configured for receiving therein a sliding element of a shading roller blind.

* * * * *